United States Patent
Siegfried et al.

(10) Patent No.: US 6,502,860 B1
(45) Date of Patent: Jan. 7, 2003

(54) TENSION SENSING SWITCH ASSEMBLY

(75) Inventors: Kenneth John Siegfried, Clarkston, MI (US); George Rodney Kohut, Troy, MI (US); Richard P Sickon, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/482,298

(22) Filed: Jan. 12, 2000

Related U.S. Application Data

(63) Continuation-in-part of application No. 09/415,533, filed on Oct. 8, 1999.

(51) Int. Cl.$^7$ ............................................... B60R 22/00

(52) U.S. Cl. .................................................. 280/801.1

(58) Field of Search ................................. 280/801, 802, 280/808, 806, 673, 617, 816, 612; 340/52 E; 242/107.4; 73/862.54; 297/480; 335/188; 206/474, 477; 24/633

(56) References Cited

U.S. PATENT DOCUMENTS

| | | | |
|---|---|---|---|
| 3,618,378 A | | 11/1971 | Shull et al. |
| 3,760,464 A | * | 9/1973 | Higuchi ........................ 24/196 |
| 3,784,972 A | * | 1/1974 | Hults ........................ 340/52 E |
| 3,817,093 A | | 6/1974 | Williams |
| 3,868,662 A | | 2/1975 | Russell, Jr. |
| 4,052,775 A | * | 10/1977 | Gavagan et al. ....... 200/61.58 B |
| 4,064,603 A | * | 12/1977 | Romanzi, Jr. ................. 24/650 |
| 4,126,919 A | * | 11/1978 | Lassche ..................... 24/230 A |
| 4,424,509 A | | 1/1984 | Andres et al. |
| 4,457,251 A | * | 7/1984 | Weman et al. ............... 116/212 |
| 4,574,911 A | | 3/1986 | North |
| 4,674,303 A | * | 6/1987 | Salcone, II ..................... 70/63 |
| 4,677,861 A | | 7/1987 | Bartholomew |
| 4,678,928 A | * | 7/1987 | Nishimura et al. .......... 180/282 |
| 4,742,886 A | | 5/1988 | Sato |
| 4,805,467 A | | 2/1989 | Bartholomew |
| 4,943,087 A | | 7/1990 | Sasaki |
| 4,979,400 A | | 12/1990 | Bartholomew |
| 5,060,977 A | * | 10/1991 | Saito ........................... 280/802 |
| 5,087,075 A | | 2/1992 | Hamaue |
| 5,133,425 A | * | 7/1992 | Han ............................. 180/270 |
| 5,181,739 A | | 1/1993 | Bauer et al. |
| 5,181,773 A | * | 1/1993 | Colvin ...................... 280/801.1 |
| 5,309,135 A | | 5/1994 | Langford |
| 5,359,756 A | * | 11/1994 | Miyauchi et al. .............. 24/603 |
| 5,364,129 A | | 11/1994 | Collins et al. |
| 5,454,591 A | | 10/1995 | Mazur et al. |
| 5,494,311 A | | 2/1996 | Blackburn et al. |
| 5,522,619 A | * | 6/1996 | Collins ........................ 280/806 |

(List continued on next page.)

FOREIGN PATENT DOCUMENTS

WO  WO 99/55559  11/1999

OTHER PUBLICATIONS

"Magnetic Field Sensors for Magnetic Position Sensing in Automotive Applications", Joseph P. Heremans, General Motor Research and Development Corporation, Apr. 1, 1997.

Primary Examiner—Daniel G. DePumpo
Assistant Examiner—Paul Royal, Jr.
(74) Attorney, Agent, or Firm—Kathryn A. Marra

(57) ABSTRACT

A tension sensing switch assembly for a seat restraint system in a vehicle includes a housing for mounting to a seat restraint buckle of the seat restraint system and an actuating member disposed in the housing for movement therein and cooperating with belt webbing. The tension sensing switch assembly also includes a spring disposed in the housing for cooperating with the actuating member. The tension sensing switch assembly further includes a switch disposed in the housing and cooperable with the actuating member to indicate a first tension level and a second tension level in the seat restraint system when the spring is deflected.

20 Claims, 3 Drawing Sheets

U.S. PATENT DOCUMENTS

| | | | |
|---|---|---|---|
| 5,570,903 A | 11/1996 | Meister et al. | |
| 5,570,932 A | 11/1996 | Collins et al. | |
| 5,583,476 A | 12/1996 | Langford | |
| 5,590,904 A | 1/1997 | Ellis et al. | |
| 5,605,348 A | 2/1997 | Blackburn et al. | |
| 5,618,056 A | 4/1997 | Schoos et al. | |
| 5,636,864 A | 6/1997 | Hori | |
| 5,672,916 A | * 9/1997 | Mattes et al. | 307/10.1 |
| 5,728,953 A | 3/1998 | Beus et al. | |
| 5,732,974 A | 3/1998 | Sayles | |
| 5,775,618 A | 7/1998 | Krambeck | |
| 5,831,172 A | 11/1998 | Kidd | |
| 5,871,232 A | 2/1999 | White | |
| 5,944,135 A | * 8/1999 | Blackburn et al. | 180/268 |
| 5,960,523 A | 10/1999 | Husby et al. | |
| 5,965,827 A | 10/1999 | Stanley et al. | |
| 5,996,421 A | 12/1999 | Husby | |
| 6,081,759 A | * 6/2000 | Husby et al. | 701/45 |
| 6,161,439 A | 12/2000 | Stanley | |
| 6,209,915 B1 | * 4/2001 | Blakesley | 280/735 |
| 6,230,088 B1 | 5/2001 | Husby | |
| 6,301,977 B1 | 10/2001 | Stojanovski | |
| 6,363,793 B2 | 4/2002 | O'Boyle | |

* cited by examiner

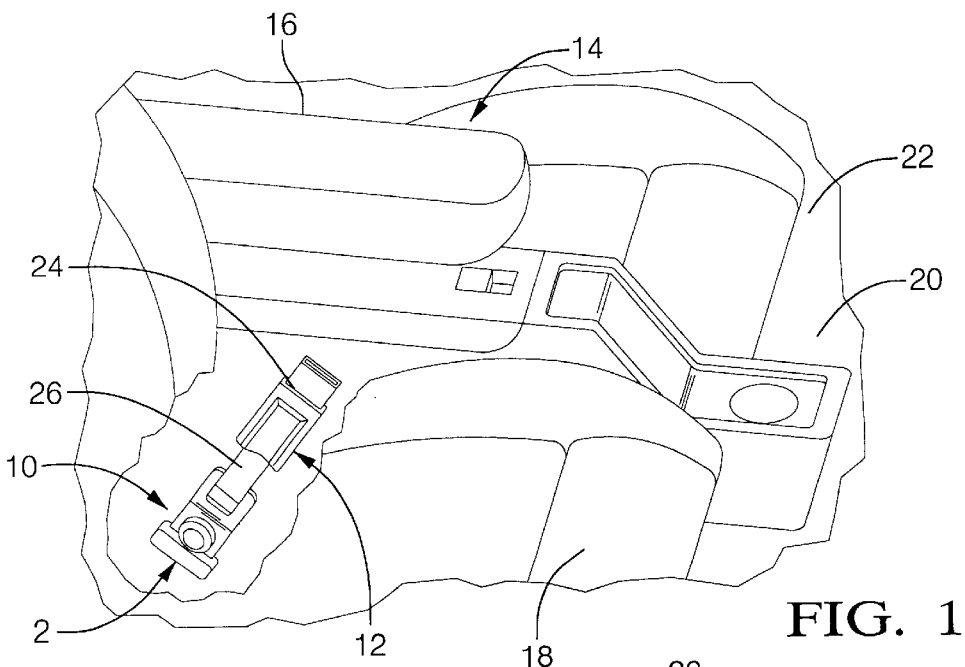
FIG. 1
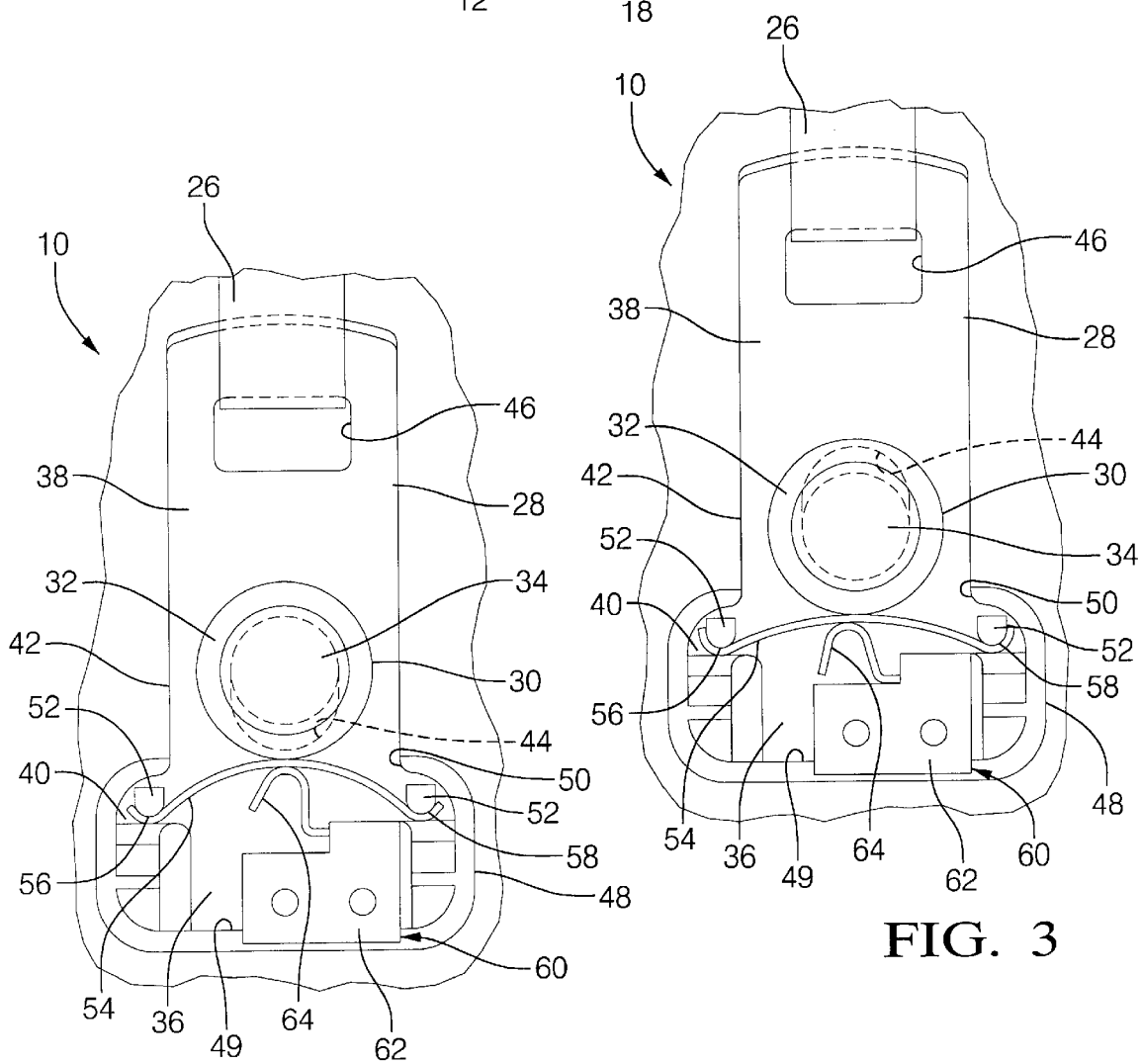
FIG. 2
FIG. 3

TENSION SENSING SWITCH ASSEMBLY

CROSS-REFERENCE TO RELATED APPLICATION

The present application is a Continuation-In-Part of application Ser. No. 09/415,533, filed Oct. 8, 1999 (H-205373).

TECHNICAL FIELD

The present invention relates generally to seat restraint systems for vehicles and, more particularly, to a tension sensing switch assembly for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

Some inflatable restraint systems want input information as to the occupancy of the vehicle seat. Deployment of the inflatable restraint may partially depend on information supplied by sensors in the seat such as for determining weight of an object in the seat. When a child seat is placed in the seat and cinched down, the sensors may need a way to distinguish between a large mass and a child seat. Typically, when a child seat is used, there will be high tension in the seat restraint system. Comfort studies have shown that typically a human occupant would not wear their seat restraint that tightly. Readings on seat restraint tension can help to decide the deployment characteristics of the inflatable restraint.

Thus, it may be desirable under certain conditions to provide a switch for sensing tension in a seat restraint system of a vehicle. It may also be desirable to provide a switch for a seat restraint system in a vehicle that allows a control module to help to determine the difference between either a child seat or an occupant. It may be further desirable to provide a switch for a seat restraint system in a vehicle that provides information used to help determine inflatable restraint deployment levels.

SUMMARY OF THE INVENTION

It is, therefore, one object of the present invention to provide a switch assembly for sensing tension in a seat restraint system of a vehicle.

It is another object of the present invention to provide a dual resistance switch for sensing tension in a seat restraint system of a vehicle.

It is yet another object of the present invention to provide a dual resistance switch mounted to a seat restraint buckle for sensing tension in a seat restraint system of a vehicle.

To achieve the foregoing objects, the present invention is a tension sensing switch assembly for a seat restraint system in a vehicle including a housing for mounting to a seat restraint buckle of the seat restraint system. The tension sensing switch assembly also includes an actuating member disposed in the housing for movement therein and cooperating with belt webbing and a spring disposed in the housing for cooperating with the actuating member. The tension sensing switch assembly further includes a switch disposed in the housing and cooperable with the actuating member to indicate a first tension level and a second tension level in the seat restraint system when the spring is deflected.

One advantage of the present invention is that a tension sensing switch assembly is provided for a seat restraint system in a vehicle. Another advantage of the present invention is that the tension sensing switch assembly senses tension in the seat restraint system to help identify what is occupying the seat, either a child, child seat or low mass adult. Yet another advantage of the present invention is that the tension sensing switch assembly has a dual resistance switch that is diagnosable. Still another advantage of the present invention is that the tension sensing switch assembly provides information useful in helping to determine deployment of an inflatable restraint system. A further advantage of the present invention is that the tension sensing switch assembly is mounted to a seat restraint buckle of the seat restraint system.

Other objects, features and advantages of the present invention will be readily appreciated, as the same becomes better understood, after reading the subsequent description taken in conjunction with the accompanying drawings.

BRIEF DESCRIPTION OF THE DRAWINGS

FIG. 1 is a perspective view of a tension sensing switch assembly, according to the present invention, illustrated in operational relationship with a seat restraint system of a vehicle.

FIG. 2 is a fragmentary plan view of the tension sensing switch assembly of FIG. 1 illustrating a low tension condition.

FIG. 3 is a view similar to FIG. 2 illustrating the tension sensing switch assembly in a high tension condition.

DESCRIPTION OF THE PREFERRED EMBODIMENT

Figure 5:
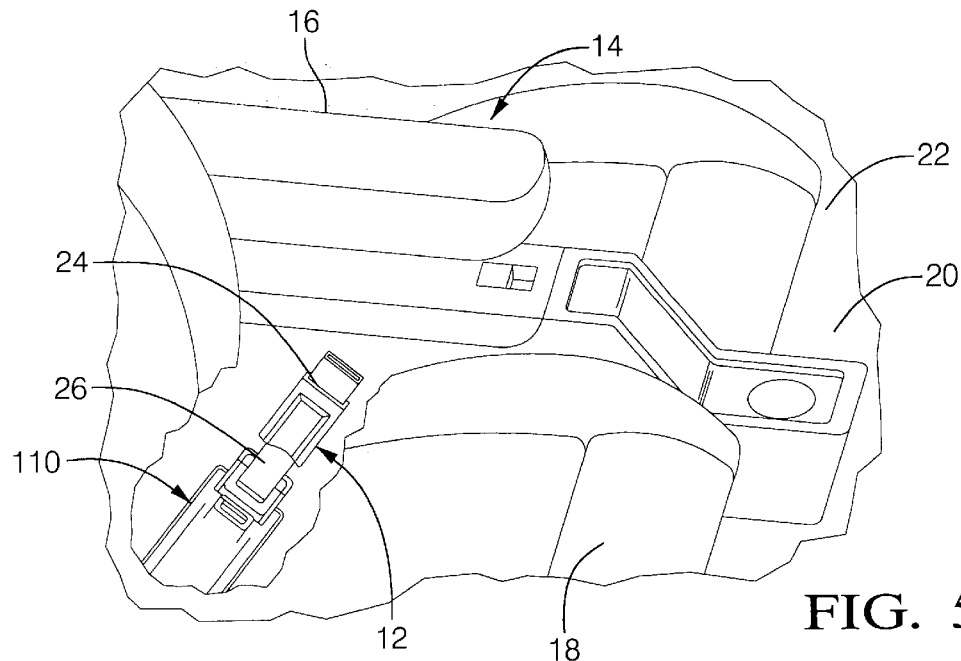
FIG. 5 is a perspective view of another embodiment, according to the present invention, of the tension sensing switch assembly of FIG. 1, illustrated in operational relationship with a seat restraint system of a vehicle.

Referring to the drawings and in particular FIGS. 1 and 2, one embodiment of a tension sensing switch assembly 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure 20 such as a floorpan in an occupant compartment 22 of the vehicle body 16. In this embodiment, the seat 18 is a front seat of the vehicle 14. It should be appreciated that the seat 18 could be a rear, second row or third row seat for the vehicle 14.

Referring to FIGS. 1 and 2, the vehicle 14 includes the seat restraint system 12 for restraining an occupant (not shown) in the seat 18. The seat restraint system 12 includes a latch tongue or plate (not shown) connected to an end of either one of a lap belt, shoulder belt, or both (not shown) which have another end connected to a retractor (not shown). The seat restraint system 12 also includes a buckle assembly 24 and the tension sensing switch assembly 10 interconnected by suitable means such as belt webbing 26. The tension sensing switch assembly 10 is connected to the vehicle structure 20 in a manner to be described. It should be appreciated that the latch plate has an aperture extending therethrough and is engageable and disengageable with the buckle assembly 24. It should be appreciated that, except for the tension sensing switch assembly 10, the seat restraint system 12 and vehicle 14 are conventional and known in the art.

Referring to FIGS. 1 through 3, the tension sensing switch assembly 10, according to the present invention, includes an anchor plate 28 connected to vehicle structure by suitable means such as an anchor bolt 30. The anchor bolt 30 has a head portion 32 extending radially and a shaft portion 34 extending axially from the head portion 32. The shaft portion 34 is generally cylindrical in shape and the head portion 32 is generally circular in shape. The head portion 32 has a diameter greater than a diameter of the shaft portion 34. The shaft portion 34 extends through an aperture 44 to be described in the anchor plate 28 and the vehicle structure 20 and is secured in place by a nut (not shown). It should be appreciated that the anchor bolt 30 is conventional and known in the art.

The anchor plate 28 has a base portion 36 and a tongue portion 38 extending axially and upwardly from the base portion 36. The base portion 36 has a first portion 40 that is generally rectangular in shape. The base portion 36 also has a second portion 42 extending axially from the base portion 36. The second portion 42 has a width less than the first portion 40. The second portion 42 has an elongated aperture or slot 44 extending therethrough and axially to receive the anchor bolt 30. It should be appreciated that the second portion 42 of the base portion 36 is disposed between the head portion 32 of the anchor bolt 30 and the vehicle structure 20. It should also be appreciated that the anchor plate 28 is movable longitudinally relative to the anchor bolt 30.

The tongue portion 38 is generally rectangular in shape and has a width the same as the second portion 42 of the base portion 36. The tongue portion 38 includes an aperture 46 extending therethrough. The aperture 46 is generally rectangular in shape and receives one end of the belt webbing 26. The base portion 36 and tongue portion 38 are made of a metal material and formed as a monolithic structure being integral, unitary and formed as one-piece.

The tension sensing switch assembly 10 also includes a housing 48 disposed about and enclosing the first portion 40 of the base portion 36 of the anchor plate 28. The housing 48 has a cavity 49 with an aperture 50 at a forward end for a function to be described. The housing 48 has a pair of posts 52 disposed in the cavity 49 and being laterally spaced and extending upwardly adjacent the aperture 50. The housing 48 is generally rectangular in shape and made of a rigid material such as plastic. It should be appreciated that only one half of the housing 48 is illustrated in FIGS. 2 and 3.

The tension sensing switch assembly 10 includes a spring 54 at least partially disposed in the cavity 49 of the housing 48. The spring 52 is of a leaf type having a first end 56 disposed about one of the posts 52 in the housing 48 and a second end 58 disposed about the other post 52 in the housing 48. The spring 54 has a bowed or arcuate shape to cooperate with the shaft portion 34 of the anchor bolt 30. The spring 54 is made of a metal material. The spring 52 is tuned to a predetermined force for comfort. The spring 54 may also be of a coil spring type. It should be appreciated that the anchor bolt 30 deflects the spring 54 when the anchor plate 28 is moved relative to the anchor bolt 30.

Figure 4:
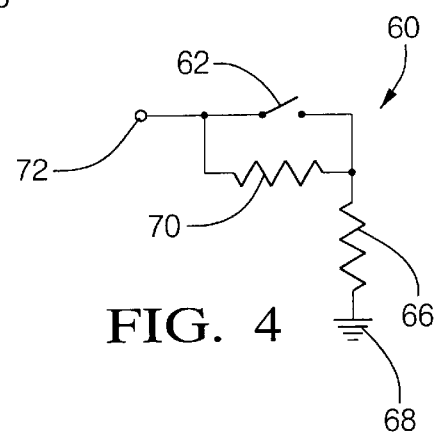
FIG. 4 is a schematic view of a circuit for the tension sensing switch assembly of FIG. 1.
Figure 6:
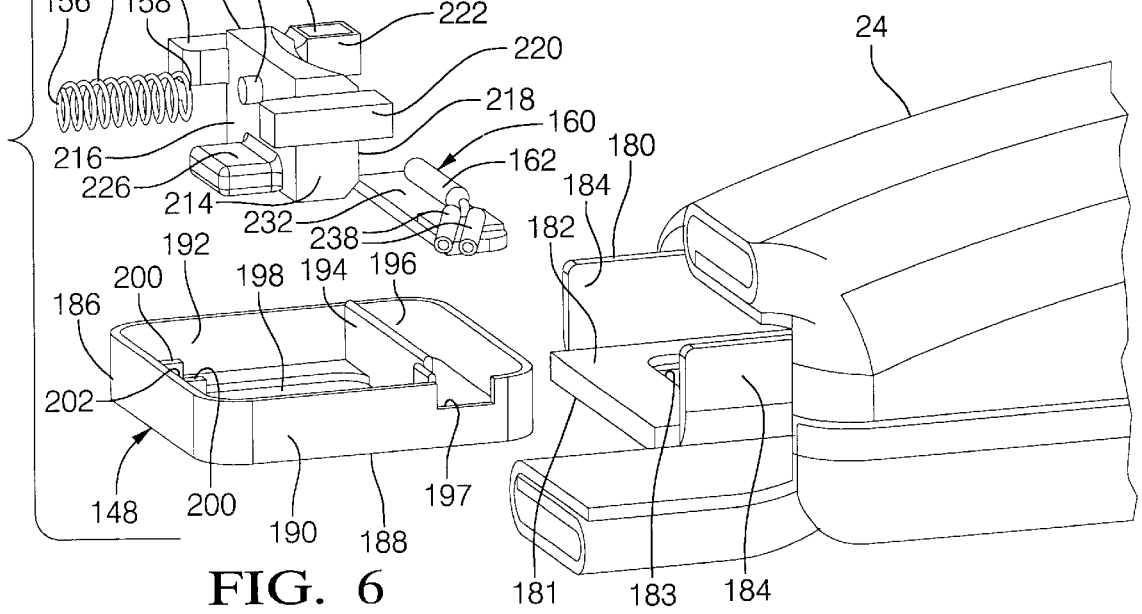
FIG. 6 is an exploded perspective view of the tension sensing switch assembly of FIG. 5.
Figure 7:
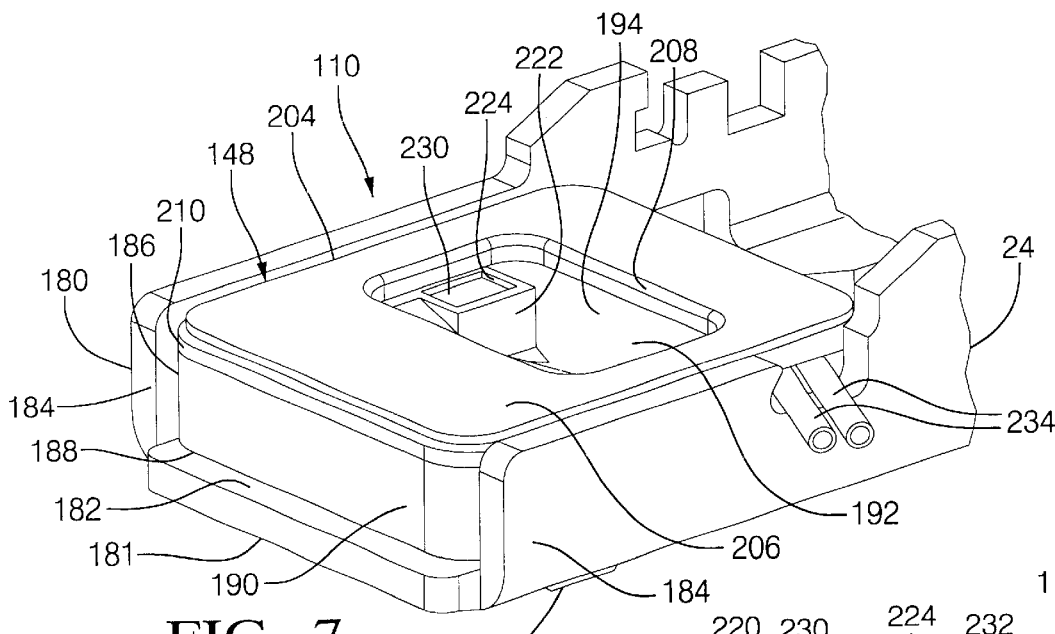
FIG. 7 is a perspective view of the tension sensing switch assembly of FIG. 5.

Referring to FIGS. 2 through 4, the tension sensing switch assembly 10 includes an electrical circuit, generally indicated at 60, for diagnosing usage of the seat restraint system 12. The electrical circuit 60 includes a switch 62 for cooperating with the spring 54. The switch 62 is diagnosable and has two positions. Preferably, the switch 62 is of a micro type that is actuated by an arm or bail 64 pivotally connected to the switch 62. The switch 62 may also be of another suitable type such as a reed or Hall effect type. The bail 64 will move or pivot when the spring 54 engages the bail 64. The spring 54 moves the bail 64 from an open or first position with the switch 62 illustrated in FIG. 2 to a closed or second position illustrated in FIG. 3. It should be appreciated that the position of the bail 64 relative to the switch 62 changes the state of the switch 62, giving a different output current from the switch 46. It should also be appreciated that the bail 64 is preloaded by a spring (not shown) to return the bail 64 to the first position.

The circuit 60 also includes a first resistor 66 interconnecting one end of the switch 62 and ground 68. The first resistor 66 has a predetermined value such as one hundred ohms (100). The circuit 60 includes a second resistor 70 connected in parallel with the switch 46 with one end interconnecting the switch 62 and the first resistor 66 and another end connected to a source of power 72 such as a controller (not shown) of the vehicle 14. The second resistor 70 has a predetermined value such as three hundred ohms (300). The circuit 60 is mounted on a circuit board (not shown) connected to the housing 48 and is potted and connected by electrical leads or wires to the source of power 72 and ground 68.

In operation of the tension sensing switch assembly 10, the occupant buckles the seat restraint system 12 and the tension in the belt webbing 26 is lower than a predetermined load required to deflect the spring 54 as illustrated in FIG. 2. In this state, the tension sensing switch assembly 10 will send an open signal to the controller. Current from the source of power 72 flows through the second resistor 70 and first resistor 66 to ground 68. The flow of current through the both resistors 66 and 70 causes the controller to send a signal that there is a low tension force in the seat belt webbing 26 which may be a normal or large mass adult present in the seat 18. It should be appreciated that the anchor plate 28 of the tension sensing switch assembly 10 is spring loaded to an initial position by the spring 54.

When a child seat (not shown) is placed in the seat 18 and the seat restraint system 12 is buckled, the seat belt webbing 26 is cinched to pull the child set tightly in to the seat 18. The tension in the seat belt webbing 26 is above the predetermined level to deflect the spring 54 as illustrated in FIG. 3. In this state, the deflection of the spring 54 causes the switch 62 to change states, sending a closed contact signal to the controller. Current from the source of power 72 flows through the switch 62 and first resistor 66 to ground 68. The flow of current through only one resistor 66 causes the controller to send a signal that there is a high tension force in the seat belt webbing 26 which may be a child seat present in the seat 18. Also, if the controller receives no signal from the switch 62, the controller determines that there is an unplugged wiring connector (not shown) to the seat restraint system 12. Further, if the controller receives a signal from the switch 62 approximately equal to the current from the source of power 72, the controller determines that there is a shorted wiring connector to the seat restraint system 12. It should be appreciated that the when the belt webbing 26 is tensioned past a predetermined force, the spring 54 will deflect or travel approximately three millimeters (3.0 mm), causing the switch 62 to change states. It should be appreciated that an audible tone or visual indication may be provided when the tension in the belt webbing 26 is increased above the predetermined level.

Referring to FIGS. 5 through 9, another embodiment, according to the present invention, of the tension sensing switch assembly 10 is illustrated. Like parts of the tension sensing switch assembly 10 have like reference numerals increased by one hundred (100). In this embodiment, the tension sensing switch assembly 110 includes a housing, generally indicated at 148, mounted to a rigid frame 180 of the buckle assembly 24. The rigid frame 180 has an open forward end (not shown) and an opposite rearward end 181 attached to the belt webbing 26. The rigid frame 180 also includes a generally rectangular base plate 182 having an aperture 183 for the belt webbing 26 and side plates 184, each one of which extends longitudinally and upwards from a respective longitudinal edge of the base plate 182. It should be appreciated that the rigid frame 180 is similar to that disclosed in U.S. Pat. No. 5,271,129 to Clarke et al.

The housing 148 includes a base 186 disposed between the side plates 184 and adjacent the base plate 182 of the rigid frame 180. The base 186 is generally rectangular in shape and has a base wall 188 and a sidewall 190 extending generally perpendicular to the base wall 188 to form a first or actuator cavity 192. The base 186 also has dividing wall 194 extending laterally from the sidewall 190 to form a second or circuit cavity 196. The sidewall 190 has a recess 197 communicating with the circuit cavity 196 for a function to be described. The base 186 also includes an aperture 198 extending through the base wall 188 and communicating with the actuator cavity 192. The aperture 198 is generally rectangular in shape, but may be any suitable shape, and receives one end of the belt webbing 26. The base 186 has a pair of interior walls 200 spaced laterally and extending longitudinally from the sidewall 190 to form a third or spring cavity 202. The base 186 is made of a rigid material, preferably a plastic material, formed as a monolithic structure being integral, unitary and formed as one-piece. It should be appreciated that the base 186 is secured in the rigid frame 180 by suitable means such as an interference fit.

The housing 148 also includes a cover 204 to cover the base 186. The cover 204 has a base wall 206 that is generally planar and rectangular in shape. The cover 204 also includes an aperture 208 extending through the base wall 206. The aperture 208 is generally rectangular in shape, but may be any suitable shape, and receives one end of the belt webbing 26. The cover 204 also has a sidewall 210 extending generally perpendicular to the base wall 206 and disposed within the sidewall 190 of the base 186 and secured thereto by suitable means such as an interference fit. The cover 204 is made of a rigid material, preferably a plastic material, formed as a monolithic structure being integral, unitary and formed as one-piece.

The tension sensing switch assembly 110 also includes an actuating member 212 disposed in the cavity for longitudinal movement relative to the sidewall 190. The actuating member 212 has a body portion 214 having a generally rectangular shape. The body portion 214 has a forward side 216 and a rearward side 218. The forward side 216 is generally arcuate in shape for a function to be described. The actuating member 212 has a pair of arm portions 220 spaced laterally and extending longitudinally for movement along the base wall 188 of the base 186. The arm portions 220 are generally rectangular in shape and located near an upper end of the body portion 214 such that a lower end of the body portion 214 extends through the aperture 198 in the base wall 188 of the base 186. One of the arm portions 220 has a cavity portion 222 at a forward end thereof forming a cavity 224 therein. The cavity 224 is generally rectangular in shape, but may be any other suitable shape for a function to be described. The actuating member 212 has a tab portion 226 extending longitudinally from the rearward side 216 at the lower end of the body portion 214 to prevent the actuating member 212 from exiting the actuator cavity 192. The tab portion 226 is generally rectangular in shape. The actuating member 212 includes a post portion 228 extending longitudinally from the rearward side 216 of the body portion 214 for a function to be described. The actuating member 212 is made of a rigid material, preferably a plastic material, formed as a monolithic structure being integral, unitary and formed as one-piece. It should be appreciated that the belt webbing 26 extends through the apertures 208 and 198 in the housing 148 and through the aperture 183 in the rigid frame 180 and is disposed adjacent the forward side 218 of the actuating member 212.

The tension sensing switch assembly 110 includes a spring 154 disposed in the spring cavity 202 of the base 186 of the housing 148. The spring 154 is of a coil type having a first end 156 disposed between the interior walls 200 in the base 186 of the housing 148 and a second end 158 disposed about the post portion 228 on the body portion 214 of the actuating member 212. The spring 154 is made of a metal material. The spring 154 is tuned to a predetermined force for comfort. It should be appreciated that the actuating member 212 deflects the spring 154 when the belt webbing 26 is moved or tightened relative to the rearward end 181 of the rigid frame 180.

Referring to FIGS. 5 through 10, the tension sensing switch assembly 110 includes an electrical circuit, generally indicated at 160, for diagnosing usage of the seat restraint system 12. The electrical circuit 160 is disposed in the circuit cavity 196 of the base 186 and includes a switch 162. The switch 162 is diagnosable and has two positions. Preferably, the switch 162 is of a magnetic reed type that is actuated by a magnet 230 disposed in the cavity 224 of the actuating member 212. The magnet 230 will translate longitudinally when the actuating member 212 is moved longitudinally. The actuating member 212 moves the magnet 230 from a closed or first position with the switch 162 illustrated in FIG. 8 to an open or second position illustrated in FIG. 9. It should be appreciated that the position of the magnet 230 relative to the switch 162 changes the state of the switch 162, giving a different output current from the switch 162. It should also be appreciated that the actuating member 212 is preloaded by the spring 154 to return the actuating member 212 and magnet 230 to the first position. It should be appreciated that the switch 162 may also be of another suitable type such as a micro, reed or Hall effect type.

The circuit 160 also includes a first resistor 166 interconnecting one end of the switch 162 and ground 168. The first resistor 166 has a predetermined value such as one hundred ohms (100). The circuit 160 includes a second resistor 170 connected in parallel with the switch 162 with one end interconnecting the switch 162 and the first resistor 166 and another end connected to a source of power 172 such as a controller (not shown) of the vehicle 14. The second resistor 170 has a predetermined value such as three hundred ohms (300). The circuit 160 is mounted on a circuit board 232 and disposed in the circuit cavity 198 of the base 186 of the housing 148 and is potted and connected by electrical leads or wires 234 extending through the recess 197 in the sidewall 190 to the source of power 172 and ground 168.

Figure 8:
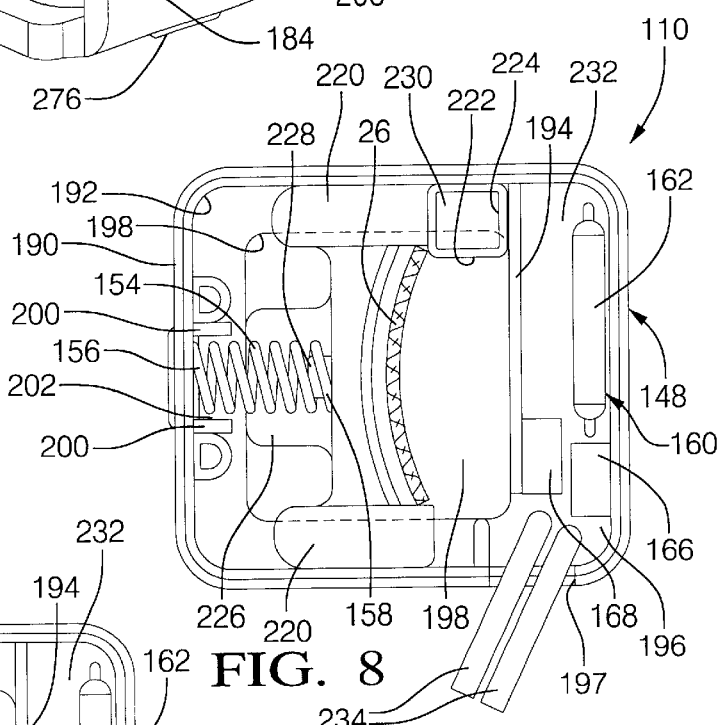
FIG. 8 is a fragmentary plan view of the tension sensing switch assembly of FIG. 5 illustrating the tension sensing switch assembly in a low tension condition.

In operation of the tension sensing switch assembly 110, the occupant buckles the seat restraint system 12 and the tension in the belt webbing 26 is lower than a predetermined load required to deflect the spring 154 as illustrated in FIG. 8. In this state, the tension sensing switch assembly 110 will send an open signal to the controller. Current from the source of power 172 flows through the second resistor 170 and first resistor 166 to ground 168. The flow of current through the both resistors 166 and 170 causes the controller to send a signal that there is a low tension force in the seat belt webbing 26 which may be typical of a normal or large mass adult present in the seat 18. It should be appreciated that the actuating member 212 of the tension sensing switch assembly 110 is spring loaded to an, initial position by the spring 154.

Figure 9:
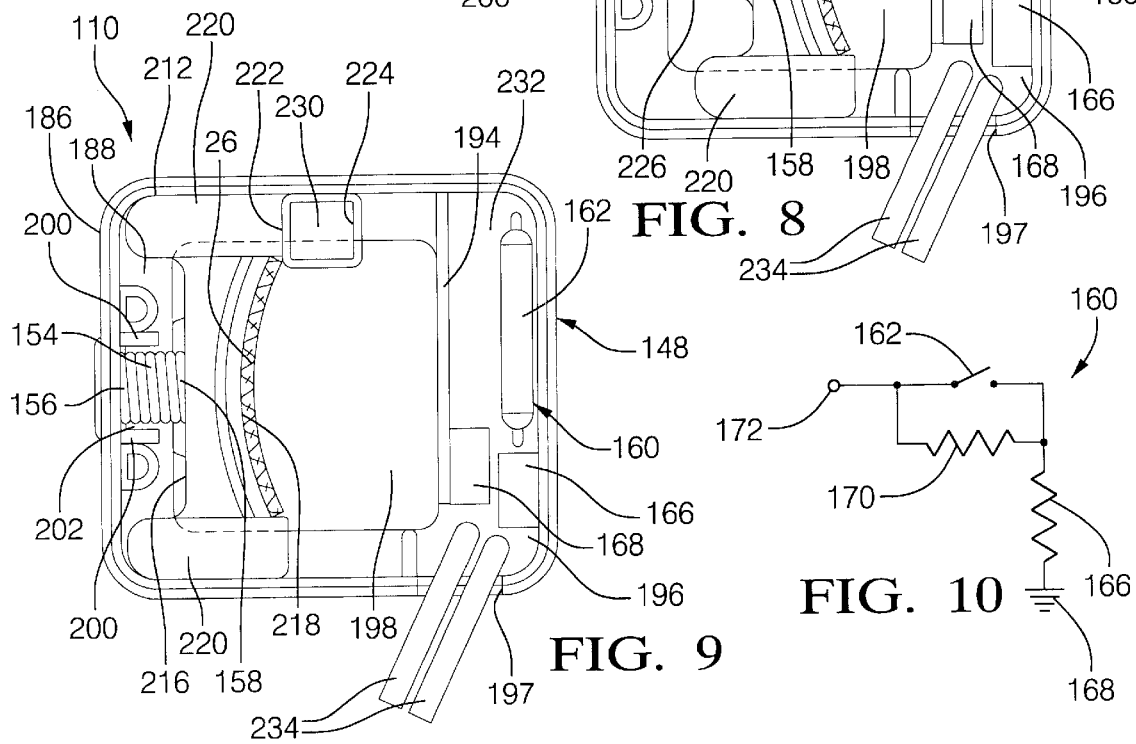
FIG. 9 is a view similar to FIG. 8 illustrating the tension sensing switch assembly in a high tension condition.
Figure 10:
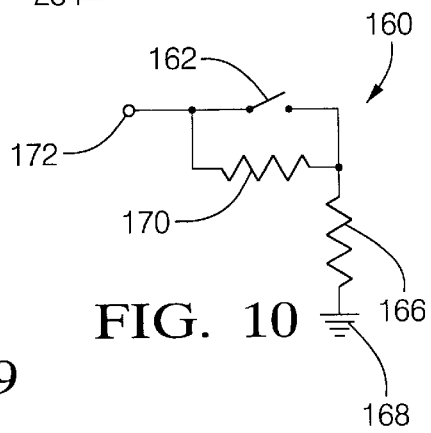
FIG. 10 is a schematic view of a circuit for the tension sensing switch assembly of FIG. 5.

When a child seat (not shown) is placed in the seat 18 and the seat restraint system 12 is buckled, the seat belt webbing 26 should be cinched by the user to pull the child set tightly in to the seat 18. The tension in the seat belt webbing 26 is typically above the predetermined level to deflect the spring 154 as illustrated in FIG. 9. In this state, the deflection of the spring 154 causes the switch 162 to change states, sending a closed contact signal to the controller. Current from the source of power 172 flows through the switch 162 and first resistor 166 to ground 168. The flow of current through only one resistor 166 causes the controller to send a signal that there is a high tension force in the seat belt 26 which may be a child seat present in the seat 18. Also, if the controller receives no signal from the switch 162, the controller determines that there is an unplugged wiring connector (not shown) to the seat restraint system 12. Further, if the controller receives a signal from the switch 162 approximately equal to the current from the source of power 172, the controller determines that there is a shorted wiring connector to the seat restraint system 12. It should be appreciated that the when the belt webbing 26 is tensioned past a predetermined force, the spring 154 will deflect or travel approximately three millimeters (3.0 mm), causing the switch 162 to change states. It should be appreciated that an audible tone or visual indication may be provided when the tension in the belt webbing 26 is increased above the predetermined level. It should also be appreciated that if the latch plate and buckle assembly 24 are buckled and the belt webbing on latch plate side is cinched or tensioned past the predetermined force or level, the belt webbing 26 would move the actuator member 212 to compress the spring 154, causing the switch 162 to change states.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A tension sensing switch assembly for a seat restraint system in a vehicle comprising:

a seat restraint buckle having a rigid frame;

a housing mounted to said rigid frame of said seat restraint buckle and having an aperture extending therethrough to allow belt webbing to extend through said housing;

an actuating member disposed in said housing for movement therein and cooperating with the belt webbing;

a spring disposed in said housing for cooperating with said actuating member; and a switch disposed in said housing and cooperable with said actuating member to indicate a first tension level and a second tension level in the seat restraint system when said spring is deflected.

2. A tension sensing switch assembly as set forth in claim 1 wherein said switch comprises either one of a magnetic reed switch, micro switch, and Hall effect switch.

3. A tension sensing switch assembly as set forth in claim 1 wherein said housing has a cavity and an aperture extending therethrough and communicating with said cavity, said actuating member being disposed in said cavity of said housing and extending at least partially through said aperture.

4. A tension sensing switch assembly as set forth in claim 1 wherein said spring is tuned to a predetermined force.

5. A tension sensing switch assembly as set forth in claim 1 including a resistor in parallel with said switch and interconnecting a source of power and ground.

6. A tension sensing switch assembly as set forth in claim 1 including a resistor in series between said switch and ground.

7. A tension sensing switch assembly as set forth in claim 1 wherein said actuating member includes a body portion extending vertically and a pair of arm portions extending longitudinally from said body portion and engaging said housing to allow said body portion to extend through an aperture in said housing.

8. A tension sensing switch assembly as set forth in claim 7 wherein said actuating member includes a tab extending longitudinally from said body portion to prevent said actuating member from exiting the aperture in said housing, and a post extending longitudinally from said body portion, said spring being at least partially disposed over said post.

9. A tension sensing switch assembly as set forth in claim 1 including a movable magnet disposed on said actuating member and cooperating with said switch.

10. A tension sensing switch assembly as set forth in claim 1 wherein said housing has a base, a cover connected to said base, and said aperture extending through said cover and said base.

11. A tension sensing resistance switch assembly as set forth in claim 10 wherein each of said base and said cover has a base wall and a side wall extending perpendicularly from said base wall, said aperture extending through said base wall to receive the belt webbing.

12. A dual resistance tension sensing switch assembly for a seat restraint system in a vehicle comprising:

a seat restraint buckle having a seat restraint buckle frame with an aperture extending therethrough;

a housing connected to said seat restraint buckle frame and having an aperture extending therethrough to allow belt webbing to extend through said housing;

an actuating member disposed in said housing for movement therein and for cooperating with the belt webbing extending through said aperture of said housing and said aperture of said seat restraint buckle frame;

a spring disposed in said housing to cooperate with said actuating member as said actuating member is moved; and a switch disposed in said housing and cooperable with said actuating member to indicate a first tension level and a second tension level in the seat restraint system when said spring is deflected.

13. A dual resistance tension sensing switch assembly as set forth in claim 12 wherein said switch comprises one of a magnetic reed switch, micro switch and Hall effect switch.

14. A dual resistance tension sensing switch assembly as set forth in claim 12 wherein said spring is tuned to a predetermined force.

15. A dual resistance tension sensing switch assembly as set forth in claim 12 including a first resistor interconnecting said switch and ground.

16. A dual resistance tension sensing switch assembly as set forth in claim 15 including a second resistor interconnecting said first resistor and a source of power and said switch.

17. A dual resistance tension sensing switch assembly as set forth in claim 12 wherein said actuating member includes a body portion extending vertically and a pair of arm portions extending longitudinally from said body portion and engaging said housing to allow said body portion to extend through an aperture in said housing.

18. A dual resistance tension sensing switch assembly as set forth in claim 17 wherein said actuating member includes a tab extending longitudinally from said body portion to prevent said actuating member from exiting the aperture in said housing, and a post extending longitudinally from said body portion, said spring being at least partially disposed over said post.

19. A dual resistance tension sensing switch assembly as set forth in claim 17 including a movable magnet mounted to one of said arm portions on said actuating member and cooperating with said switch.

20. A seat restraint system for a vehicle comprising:

a seat restraint webbing;

a seat restraint buckle having a seat restraint buckle frame with a base plate and an aperture extending through said base plate;

a housing connected to said seat restraint buckle frame and having an aperture extending therethrough to allow said seat restraint webbing to extend through said housing;

an actuating member disposed in said housing for movement therein and cooperating with said seat restraint webbing, said seat restraint webbing extending through said aperture of said housing and said aperture of said base plate of said seat restraint buckle frame and disposed adjacent one side of said actuating member;

a spring disposed in said housing to cooperate with said actuating member as said actuating member is moved;

a magnet mounted to said actuating member; and a switch disposed in said housing and cooperable with said magnet to indicate a first tension level and a second tension level in the seat restraint system when said spring is deflected.

* * * * *